United States Patent [19]

Kiguchi et al.

[11] Patent Number: 5,146,493
[45] Date of Patent: Sep. 8, 1992

[54] COMMUNICATION SYSTEM

[75] Inventors: Masao Kiguchi, Yokohama; Yuji Kurosawa, Kawasaki, both of Japan

[73] Assignee: Canon Kabushiki Kaisha, Tokyo, Japan

[21] Appl. No.: 537,817

[22] Filed: Jun. 14, 1990

[30] Foreign Application Priority Data

| Jul. 6, 1989 | [JP] | Japan | 1-175074 |
| Oct. 5, 1989 | [JP] | Japan | 1-261875 |
| Nov. 17, 1989 | [JP] | Japan | 1-297376 |

[51] Int. Cl.$^5$ ............................................. H04M 1/27
[52] U.S. Cl. ................................. 379/357; 379/355; 379/413
[58] Field of Search ............... 379/355, 357, 359, 361, 379/413

[56] References Cited

U.S. PATENT DOCUMENTS

| 4,126,768 | 11/1978 | Gruzow | 379/357 |
| 4,630,201 | 12/1986 | White | 379/357 |
| 4,914,691 | 4/1990 | Berger | 379/357 |

FOREIGN PATENT DOCUMENTS

| 0011450 | 1/1989 | Japan | 379/357 |
| 0007649 | 1/1990 | Japan | 379/357 |
| 0119458 | 5/1990 | Japan | 379/357 |
| 0404452 | 12/1990 | Japan | 379/357 |

*Primary Examiner*—James L. Dwyer
*Assistant Examiner*—M. Shehata
*Attorney, Agent, or Firm*—Fitzpatrick, Cella, Harper & Scinto

[57] ABSTRACT

A communication system receives data from a portable device without using a conductor. The data-receiving side obtains electric power from the outside. The portable device obtains electric power from its internal power supply or the data-transmitting side.

36 Claims, 10 Drawing Sheets

COMMUNICATION SYSTEM

BACKGROUND OF THE INVENTION

1. Field of the Invention

This invention relates to a communication system consisting of a card-like device and a communication apparatus which receives data from the card-like device.

2. Description of the Related Art

Heretofore, there have been systems which utilize portable external memories, such as IC cards.

There has, for example, been a system in which telephone numbers for abbreviated dialing are registered in an IC card, and calling is performed by connecting the IC card to a telephone set. However, since such an IC card is mechanically connected to the telephone set, there is the disadvantage that a connecting portion of the IC card is mechanically deteriorated by repeating the connection.

There has also been a system in which an acoustic coupler is provided in a portable electronic computer or the like, and a dial number previously registered in the portable electronic computer is transmitted from the acoustic coupler as a PB (push-button) tone. This kind of device performs calling by transmitting the PB tone from the transmitter of a telephone set to a central control.

Such a portable device incorporates a power supply, such as a lithium battery or the like.

When the device performs the function of data holding, calculation or the like in a portable state, only a small amount of power is needed. However, when it is intended to execute additional functions, power consumption increases, and hence there is the possibility that the exhaustion of the battery will frequently occur. Thus, there is the disadvantage that reliability cannot be maintained.

SUMMARY OF THE INVENTION

It is an object of the present invention to improve the reliability of a device having a limited capacity for its power supply.

It is a further object of the present invention to supplement the capacity of a power supply of a device.

It is a still further object of the present invention to improve the reliability of a communication apparatus.

It is still another object of the present invention to enrich the function of a card-like device.

It is still a further object of the present invention to improve the reliability of a portable dial number generator.

It is still another object of the present invention to supplement the capacity of a power supply of a portable dial number generator.

It is still another object of the present invention to prevent decrease in the capability of a communication apparatus even if the voltage in a circuit decreases.

It is still another object of the present invention to provide a communication apparatus capable of performing exact calling even if the voltage in a circuit decreases.

It is still another object of the present invention to arrange so as to perform exact calling even in the case of power failure.

These and other objects and features of the present invention will become more apparent from the following description of the preferred embodiments.

DETAILED DESCRIPTION OF THE PREFERRED EMBODIMENTS

First Embodiment

This embodiment relates to a facsimile apparatus which performs calling according to a dial number input from a portable calling device. In the embodiment, the power consumption of a built-in power supply is reduced, and a stable calling operation is maintained. That is, when the calling device is mounted on a main unit (facsimile), power is supplied from the main unit (a commercial power supply or a station power supply supplied from a telephone line). Accordingly, when the calling device is mounted on the main unit, it performs a calling operation using the power supply in the main unit. Hence, the power consumption of the power supply within the calling device can be reduced to prolong the life of the power supply and to maintain a stable calling operation, and the reliability of the device can be increased.

Figure 1:
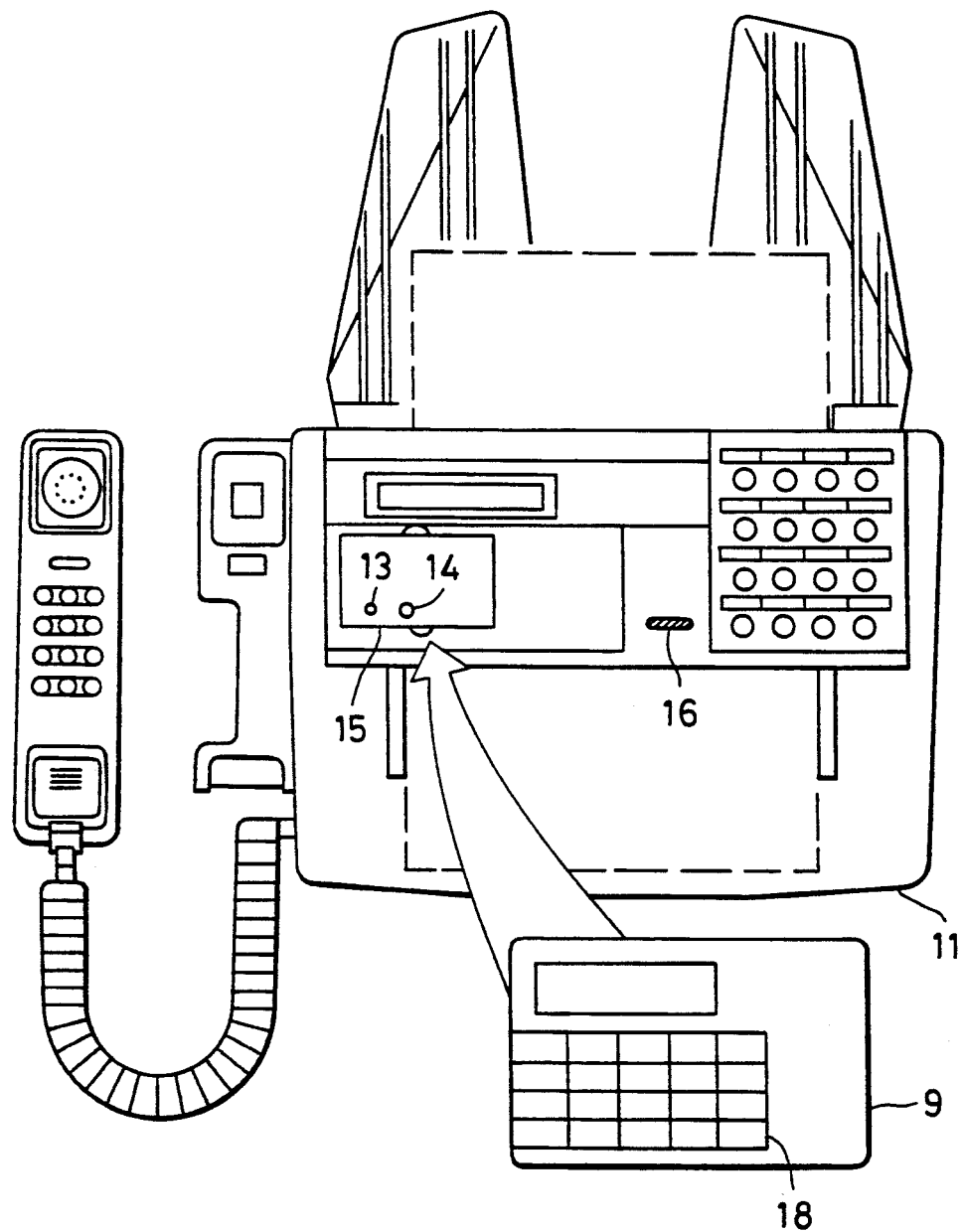
FIG. 1 is a top plan view of a facsimile and a calling device according to a first embodiment of the present invention.

FIG. 1 is a top plan view of the facsimile and calling device of the present embodiment. In FIG. 1, there are shown a card-like calling device 9, a main unit 11, a phototransistor 13, a power supply terminal 14, a calling device setting unit 15, an on-hook button 16, and a keyboard 18 capable of inputting the alphabet, numerals and the like.

Figure 2:
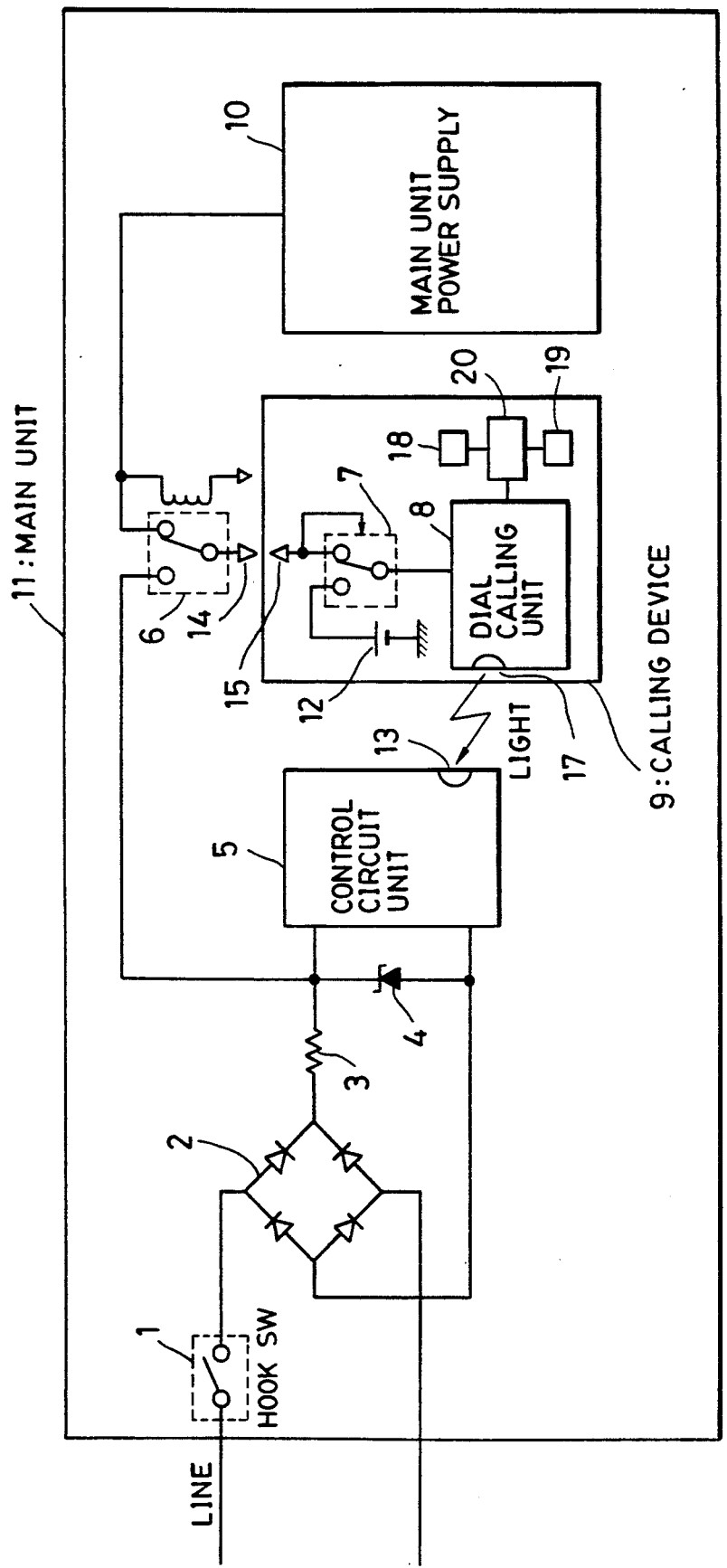
FIG. 2 is a block diagram of the first embodiment.

FIG. 2 is a block diagram showing the configuration of the main unit and calling device of the present embodiment.

The calling device 9 according to the present embodiment is a so-called card-like portable electronic notebook. The main unit 11 for mounting the calling device 9 is a facsimile, and performs calling according to telephone number information input from the calling device 9.

An internal power supply 12, a switch 7 and a dial calling unit 8 are provided within the calling device 9. The internal power supply 12 comprises a lithium battery or the like, and is mainly used as a power supply when the calling device 9 is carried to be used in a portable state. The switch 7 is a relay, which interrupts the line of the internal power supply 12 and connects the dial calling unit 8 to an external power supply, when the external power supply is input to the external input terminal 15 of the calling device 9 from the outside. The dial calling unit 8 supplies the phototransistor 13 in a control circuit unit 5 with telephone number information using optical coupling by driving to light a light-emitting device 17. A memory 19 stores dial numbers, names and the like. A control circuit 20 controls the dial calling unit 8 and the memory 19 according to commands from the keyboard 18. The keyboard 18, memory 19 and control circuit 20 are driven by the internal power supply 12.

The main unit 11 includes a hook switch 1 for opening or closing a DC circuit in accordance with the on-hook button 16, a diode bridge 2 for regulating the polarity of the line, a resistor 3 and a voltage regulation diode 4 for obtaining the drive voltage for the control circuit unit 5 from the circuit voltage, and the control circuit unit 5 for controlling the circuit by obtaining power from the circuit.

The main unit 11 also includes a relay 6, which switches the power supplied to the calling device 9 between a station power supplied from the line and a main unit power supply 10 providing driving power from AC voltage supplied from an AC receptacle. That is, the relay 6 connects the main unit power supply 10 to the external input terminal 15 of the calling device 9 when the main unit power supply 10 is turned on, and connects the station power supply to the external input terminal 15 of the calling device 9 when the main unit power supply 10 is turned off.

The control circuit unit 5 controls the hook switch 1 to connect or disconnect the circuit according to an output from the phototransistor 13.

Figure 3:
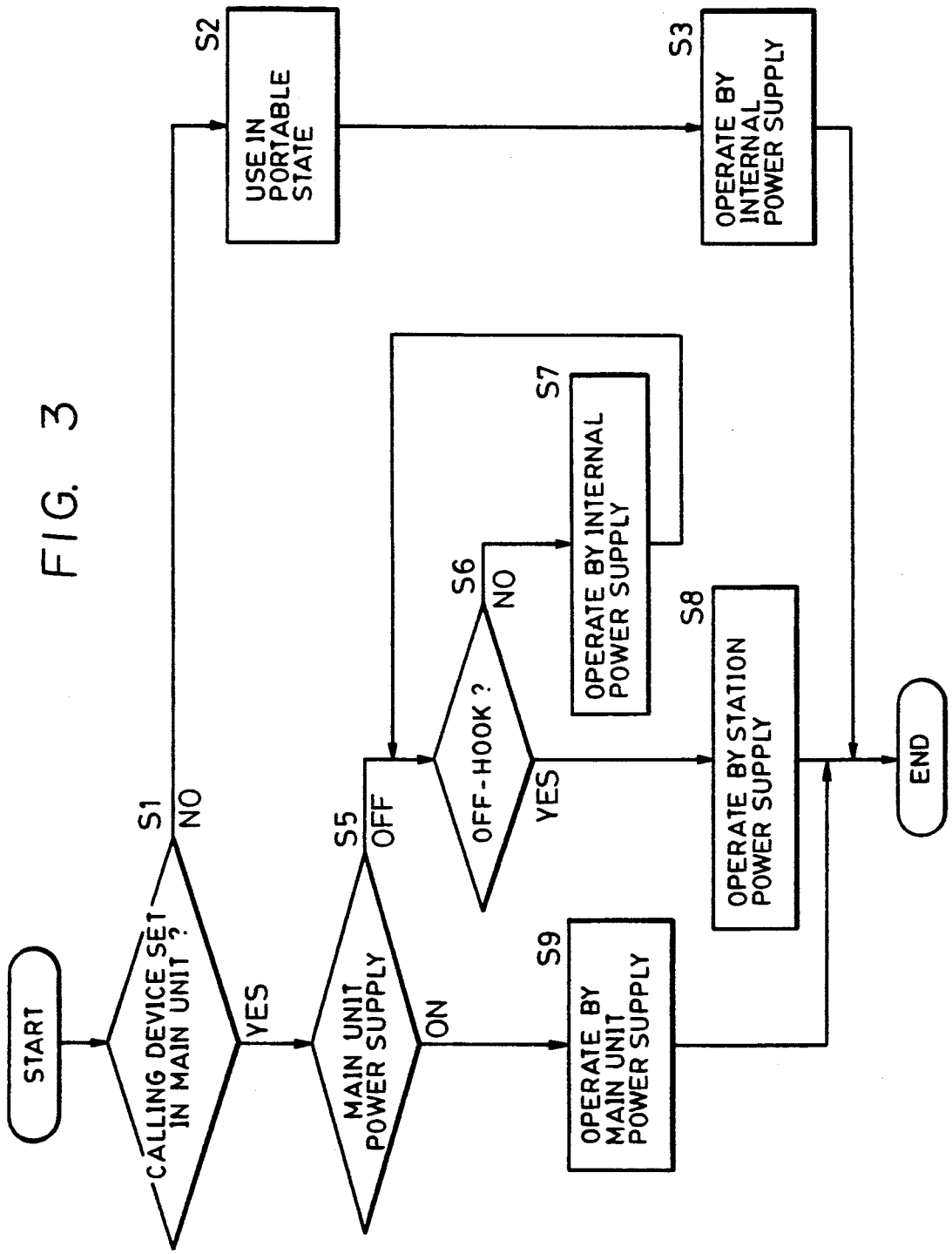
FIG. 3 is a flowchart of the first embodiment.

FIG. 3 is a flowchart showing the switching operation of the power supplies in the embodiment.

When the calling device 9 is not set in the main unit 11 (S1), and is used in a portable state (S2), the dial calling unit 8 operates using the internal power supply 12 (S3).

That is, the calling device 9 of the present embodiment can register dial numbers and names in the memory 19, retrieve registered dial numbers, and be used as a computer, without being set in the main unit 11. The dial calling unit 8 performs the above-described operations in accordance with commands from the keyboard 18.

When the main unit power supply 10 is turned on in a state in which the calling device 9 is set in the main unit 11 (S5), the dial calling unit 8 operates using the main unit power supply 10 (S9).

When the main unit power supply 10 is not turned on (S5), and if the hook switch 1 is in an off-hook state (S6) the dial calling unit 8 operates using the station power supply (S8). If the hook switch 1 is in an on-hook state (S6), the dial calling unit 8 temporarily operates using the internal power supply 12 (S7), and operates using the station power supply after the operator has performed an off-hook operation.

The control circuit 20 of the calling device 9 reads a dial number from the memory 19 in accordance with a command from the keyboard 18. The dial calling device 8 flashes the light-emitting device 17 in accordance with the dial number thus read by the control circuit 20.

On the other hand, the control circuit unit 5 of the main unit 11 switches on and off the hook switch 1 in accordance with the dial number received as an optical signal from the calling device 9 to transmit dial pulses to the line. Alternatively, a dial tone may be transmitted to the line.

Thus, by effectively utilizing an external power supply for a calling operation, the power consumption of the internal power supply 12 can be reduced to prolong its life, and to increase the reliability of the device.

As described above, according to the present embodiment, by performing a calling operation by the calling device using the power supplies at the side of the main unit, the power consumption of the power supply within the calling device can be reduced to prolong its life, and to maintain a stable calling operation. Hence, the reliability of the device can be increased.

That is, in the present embodiment, by supplying the calling device 9 with the power from the internal power supply 12, it is possible to register dial numbers and names in the memory 19 without setting the calling device 9 in the main unit 11. When the power supply 10 of the main unit 11 is turned on, the calling unit 8 can save the internal power supply 12 by transmitting data to the main unit 11 utilizing the power from the main unit power supply 10. When the main unit power supply 10 of the main unit 11 is turned off, the calling unit 8 transmits calling data to the main unit 11 utilizing the power from the station power supply. According to such a configuration, in the case of, for example, power failure, it becomes possible to effect conversation even though fascimile communication cannot be performed. Even in such cases, the control circuit 20 and the memory 19 are driven by the internal power supply 12.

Furthermore, in the present embodiment, since the control circuit unit 5 receives a dial number as an optical signal from the calling device 9, the present embodiment has the effects that the unit 5 has few mechanical troubles, is resistant against noise, and has few misoperations.

Second Embodiment

Figure 4:
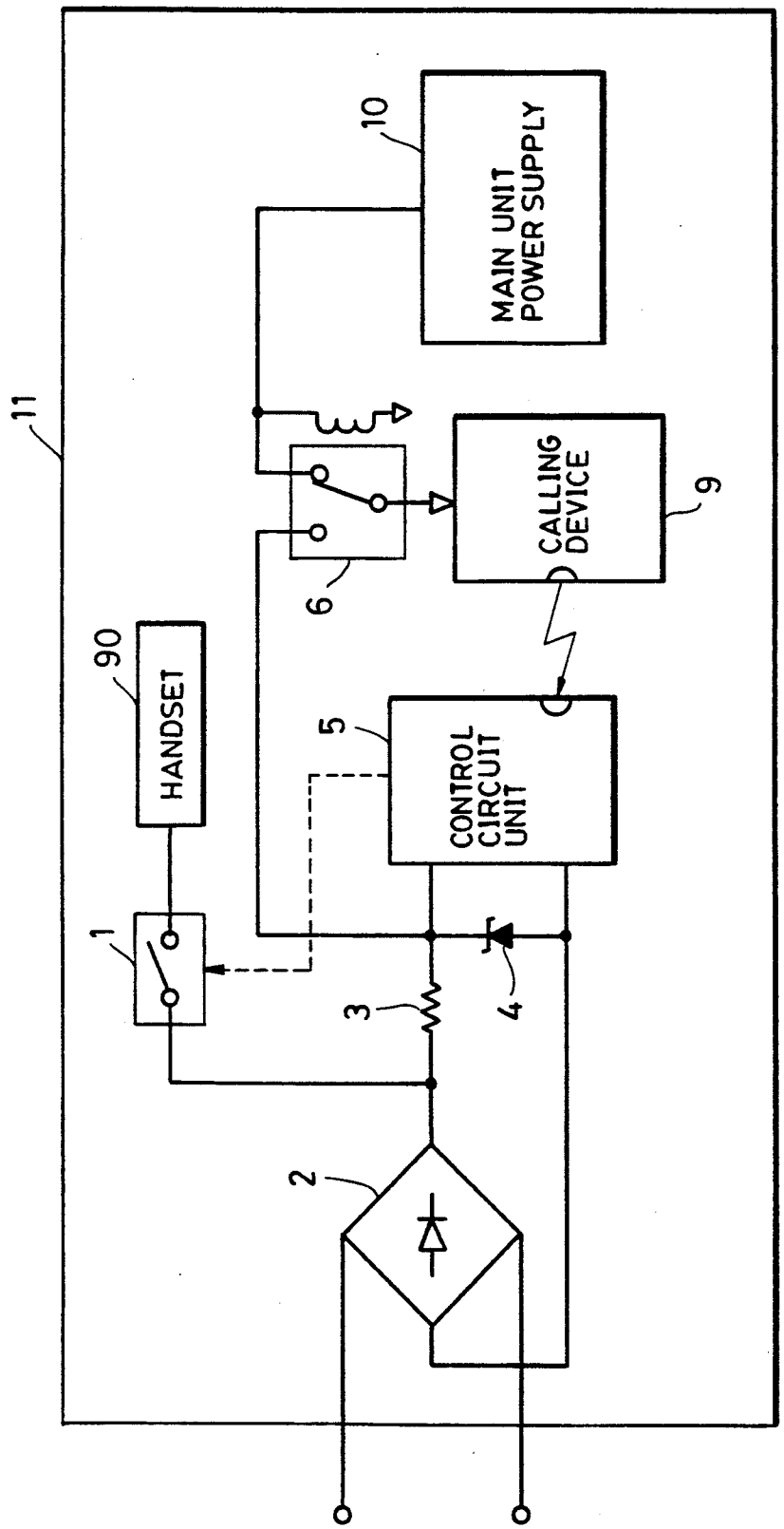
FIG. 4 is a block diagram of a second embodiment.

FIG. 4 shows a modified example of the first embodiment.

In this second embodiment, power is supplied from the circuit to the control circuit unit 5 even in the case of an on-hook operation.

In the present embodiment, when the control circuit unit 5 receives a dial number from the calling device 9 in an on-hook state, the control circuit unit 5 stores the dial number in a built-in memory. The control circuit unit 5 then switches on the hook switch 1 to catch the line, and transmits a dial signal to the line. Hence, according to the present embodiment, the operator can perform calling without pushing an off-hook switch.

Third Embodiment

Figure 5:
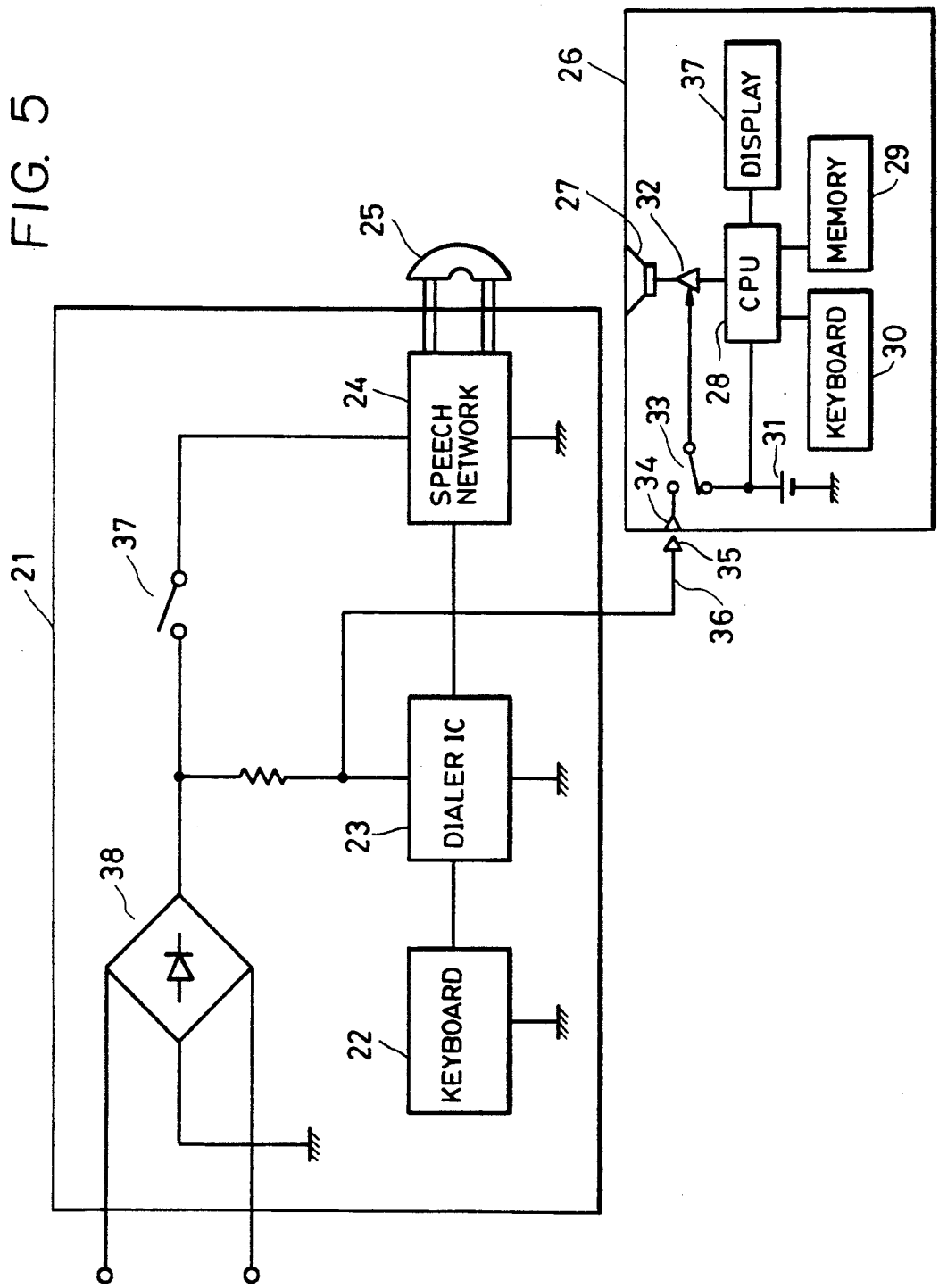
FIG. 5 is a block diagram of a third embodiment.

FIG. 5 shows the configuration of a telephone set 21 and a portable electronic computer 26 according to a third embodiment of the present invention.

In the telephone set 21, a dialer IC 23 makes a speech network 24 generate a dial tone in accordance with a numeral input from a keyboard 22.

In the electronic computer 26, a CPU 28 registers a dial number and a number input from a keyboard 30 in a memory 29. The CPU 28 also reads data from the memory 29 in accordance with a command from the keyboard 30. A display 37 displays the dial number and name read from the memory 29. A driver 32 generates the dial number as a dial tone from a speaker 27. A relay 33 supplies the driver 32 with power fron an external power supply when such power supply is connected to an external power supply terminal 34, and supplies the driver 32 with power from a battery 31 when power is not suplied to the external power supply terminal 34.

Power is supplied from the battery 31 to the CPU 28, memory 29, keyboard 30, and display 37.

In the present embodiment, a power supply cable 36 comes from the main body of the telephone set 21. A terminal 35 is attached at the distal end of the power supply cable 36. A current from the line is supplied to the power supply cable 36 by a diode bride 38. The computer 26 is usable when the terminal 35 is connected to the power supply terminal 34.

By performing an off-hook operation of a handset 25 and bringing the speaker 27 close to the receiver of the handset 25, the operator comands calling from the keyboard 30. In accordance with this operation, the CPU 28 transmits the dial number displayed on the display 37 from the speaker 27 as a dial tone.

Thus, according to the present embodiment, by supplying the driver 32, which needs more electric power than other components, with a power supply from the line, it is possible to save the power consumption of the battery 31.

Fourth Embodiment

In a fourth embodiment, when the connection of a card device 53 storing dial numbers has been detected, a main control unit 41 catches the line. An LED (light-emitting diode) 44 then emits light by a current from the telephone line. A photodiode 45 performs photoelectric conversion of the light emitted from the LED 44 to supply the card device 53 with electric power. Accordingly, the card device 53 can be driven by the current from the telephone line.

Figure 6:
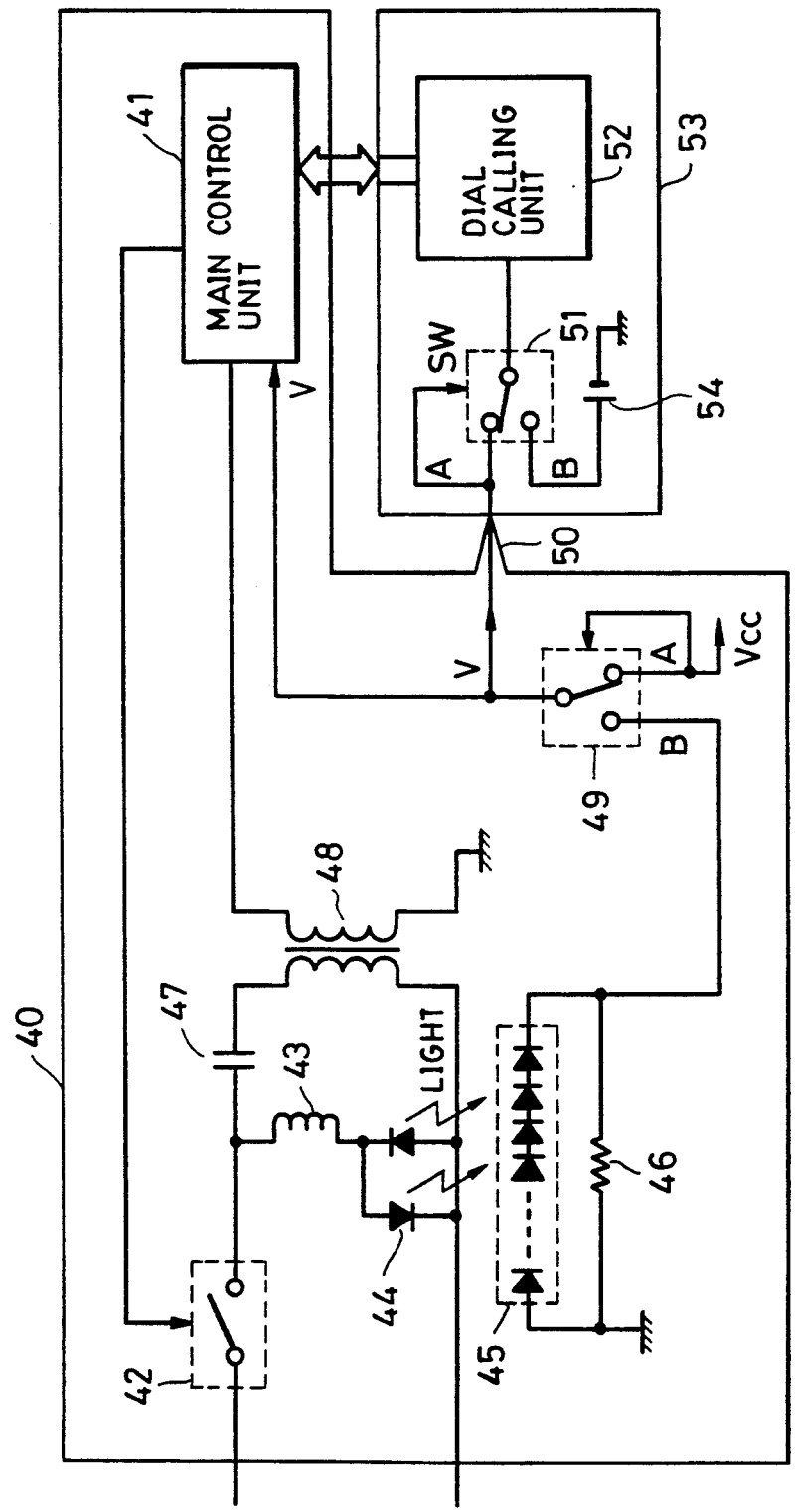
FIG. 6 is a block diagram of a fourth embodiment.

FIG. 6 is a block diagram of the present embodiment. In FIG. 6, there are shown a facsimile 40, serving as a main unit, and a main control unit 41. A switch 42 opens or closes the DC circuit, and transmits dial pulses. A letter coil 43 holds the DC circuit. An LED (light-emitting diode) 44 emits light in response to the current in the DC circuit, and is provided in the two directions so as to emit light irrespective of the polarity of the DC current. A photovoltaic diode array (consisting of solar cells or blue cells) 45 generates an electromotive force when it receives the light from the LED 44. There is also shown a load resistance 46. A capacitor 47 cuts direct current. An audio transformer 48 couples AC signals in an insulated state. A switch 49 switches between a facsimile power supply Vcc obtained from a commercial power supply and a power supply obtained from the above-described diode array 45, and is selected to its side A in FIG. 6 when the facsimile power supply is turned on.

There is also shown a detachable calling card device 53. A switch 51 switches between a battery power supply 54 incorporated within the detachable card device 53 and a main unit power supply V, and is selected to its side A in FIG. 6 when the main unit power supply V is turned on. A dial calling unit 52 notifies the main control 41 of a dial number by a sound signal or an optical signal. A battery 54 comprises a lithium battery or the like.

According to the indication from the dial calling unit 52, the main control unit 41 operates the switch 42 in a dial pulse mode, or transmits a signal by transformer coupling from the audio transformer 48 in a DTMF (dual-tone multifrequency) mode.

A connector 50 supplies the card device 53 with electric power from the main unit 40, which is detachable relative to the main unit 40 via the connector 50.

Next, the basic operation will be explained.

Figure 7:
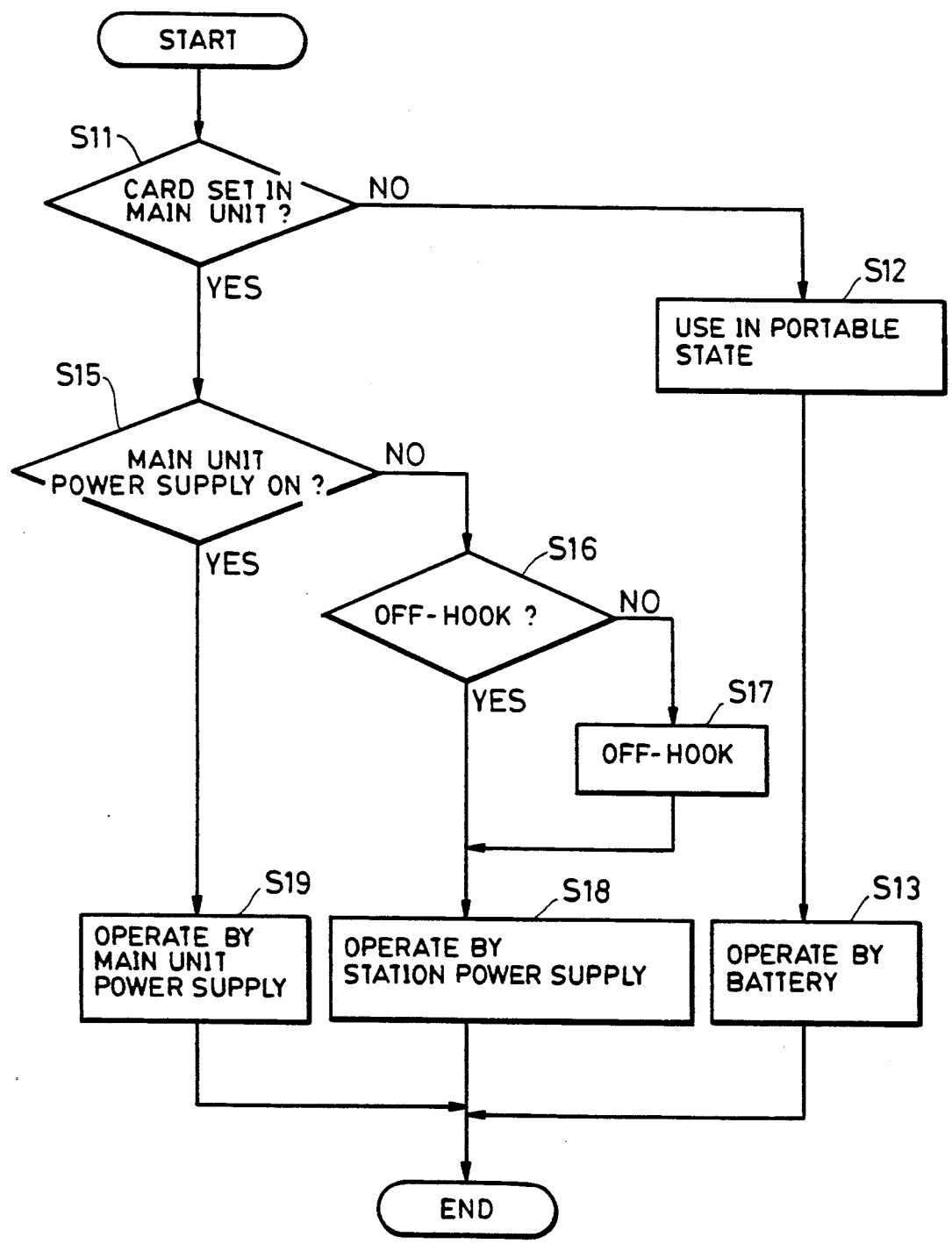
FIG. 7 is a flowchart of the fourth embodiment.

FIG. 7 is a flowchart showing the operation.

When the card device 53 is not set in the main unit 40 (step S11), that is, the card device 53 is used in a portable state without being connected to the connector 50 (step S12), the card device 53 operates by the battery 54 incorporated within the card main body (step S13).

Even when the card device 53 is set in the main unit 40, the power supply in the main unit 40 cannot be utilized if the AC power supply is turned off or in the case of power failure (step S15). Hence, the station power supply is utilized in such cases. When the switch 42 is not in an off-hook state (step S16), the operator switches on the switch 42 (step S17) to close the DC circuit. When the DC circuit is closed, a current flows from the line in the LED 44, which emits light. Its output light is projected onto the photovoltaic diode array (solar cells) 45, and the main control unit 41 and the dial calling unit 52 are driven by the output voltage of the diode array 45 (step S18).

When the power supply (Vcc) (commercial power supply) of the main unit 40 is turned on at step S15, the switch 49 is switched to its side A, and the main control unit 41 and the dial calling unit 52 are driven by Vcc (step S19).

As explained above, when the card device 53 is used in a portable state, the card device 53 is driven by the battery. When the card device 53 is set in the main unit 40 to be used as a calling device, the card device 53 is driven by the main unit power supply or the station power supply (in the case of power failure). Accordingly, it is possible to prevent the exhaustion of the battery which often occurs in a portable device, and hence to maintain high reliability for the device.

Furthermore, in the present embodiment, even when the commercial power supply is turned off due to power failure or the like, the device at the secondary side electrically insulated from the line is driven by the station power supply, by closing the DC circuit to light the light-emitting device 44 and by projecting its output light onto the solar cells. Accordingly, the present embodiment has the advantage that it is possible to realize a communciation device (secondary-side device) which does not need a commercial power supply when calling.

That is, by supplying the card device 53 with electric power by the current from the telephone line, a secure supply of electric power is realized. Accordingly, it is possible to prevent incapability of operation due to the exhaustion of the power supply.

Fifth Embodiment

A fifth embodiment of the present invention will now be explained in detail with reference to the drawings.

Figure 8:
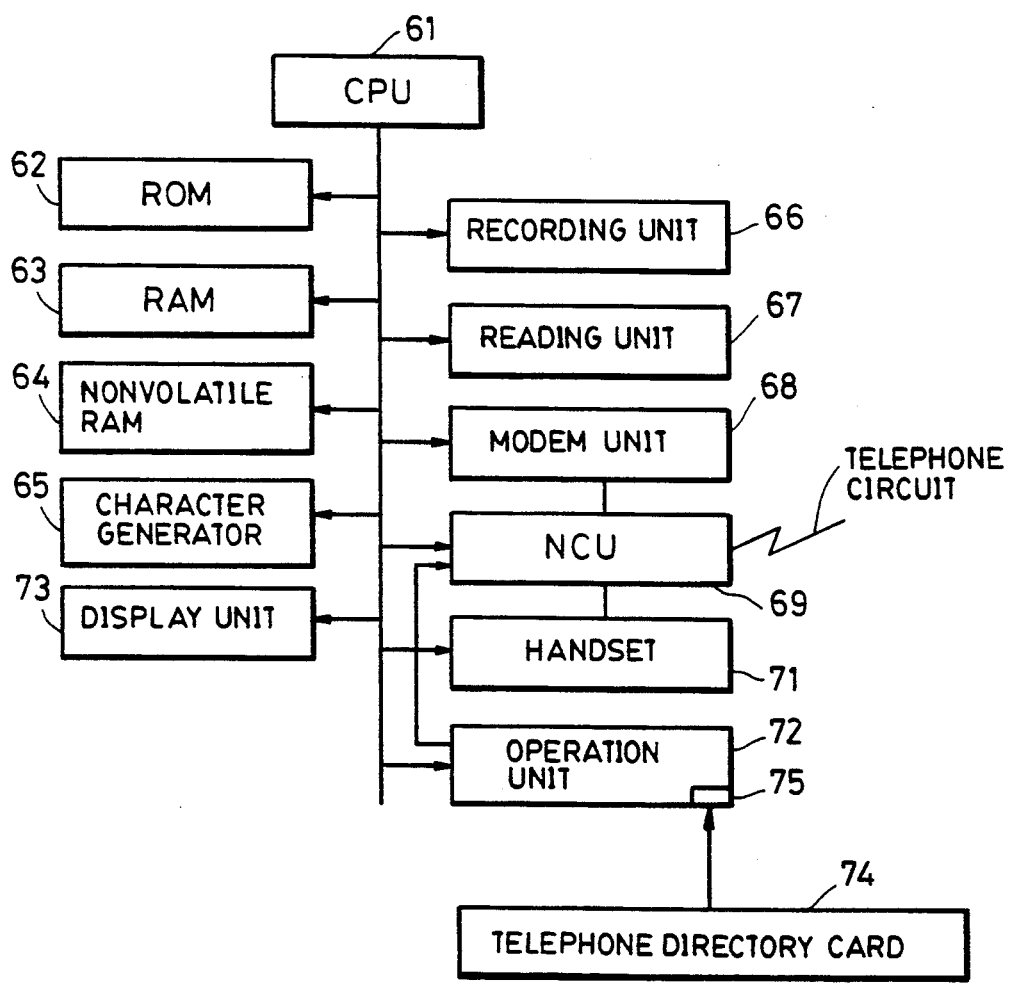
FIG. 8 is a block diagram of a fifth embodiment.

FIG. 8 shows the configuration of a facsimile according to the present embodiment.

In FIG. 8, a CPU 61 comprises a microprocessor and the like, and controls the entire facsimile according to a program stored in a ROM 62. A RAM 63 stores binary-coded image data. A nonvolatile RAM 64 securely stores data to be preserved even in a state in which the power supply of the facsimile is interrupted. A character generator 65 comprises a ROM for storing characters, such as JIS (Japanese Industrial Standards) codes, ASCII codes and the like. A recording unit 66 takes out recorded data stored in the RAM 63 by the control of the CPU 61, and ouputs and records the data as hard copy. A reading unit 67 performs binary coding of data read using a CCD, and sequentially transmits the binary-coded data to the RAM 63. A modem unit 68 modulates data to be transmitted stored in the RAM 63 according to the control by the CPU 61, and outputs the modulated data to the telephone circuit. The modem unit 68 also receives analog signals from the telephone circuit, and stores data obtained by modulating and binary-coding the signals in the RAM 63.

An NCU (network control unit) 69 connects the telephone circuit to either the modem unit 68 or a handset 71 for communication by switching according to the control of the CPU 61.

An operation unit 72 comprises a key for starting image transmission/reception and the like, a mode selection key for assigning an operation mode in transmission/reception, such as fine/standard/automatic reception and the like, ten keys for dialing, and the like. The CPU 61 detects the depressed state of these keys, and controls the above-described respective units in accordance with the state. A display unit 73 displays characters and the like.

An electronic telephone directory card (termed hereinafter "telephone directory card") 74 is connected to the operation unit 72 via an interface circuit 75. The telephone directory card 74 has a display unit and a keyboard, like known electronic notebooks and the like, and incorporates a memory for registering telephone numbers. The method, for retrieval using the display unit and keyboard in the telephone directory card 74 is the same as in conventional electronic notebooks. The telephone directory card 74 can be independently used for the retrieval of a telephone number. In the present embodiment, telephone-number data stored in the telephone directory card 74 are input to the main body of the facsimile via the interface circuit 75 to make the main body call the number. It is also possible to perform processing such as, for example, transferring data registered independently in the telephone directory card 74 to a memory (for example, the nonvolatile RAM 64) in the main body.

Figure 9:
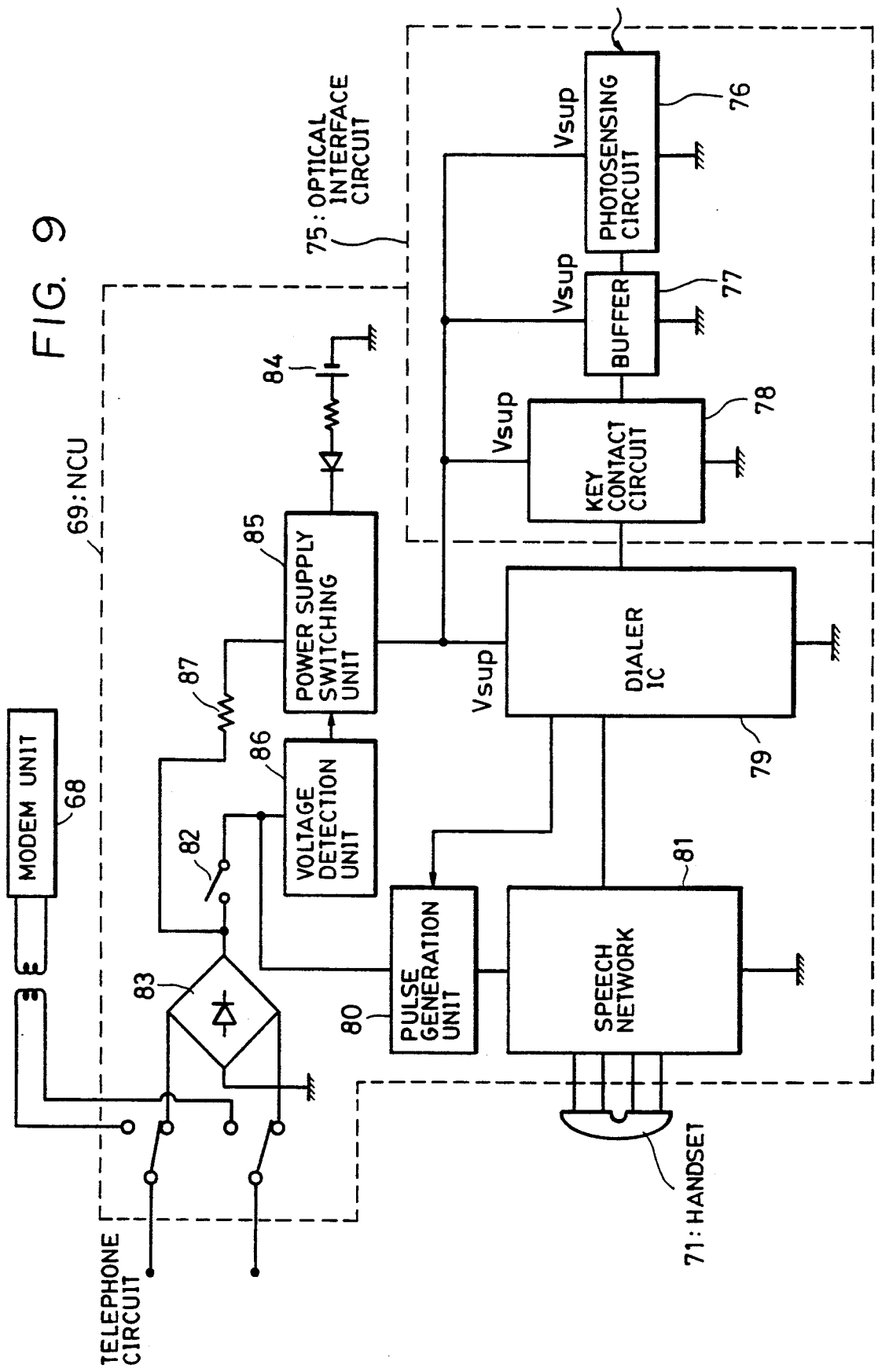
FIG. 9 is a block diagram of an NCU (network control unit) 69 and an optical interface circuit 75 shown in FIG. 8.

FIG. 9 shows the NCU 69, the operation unit, the optical interface circuit 75, and circuits therearound in the main body of the facsimile.

In FIG. 9, an optical signal issued from the detachable telephone directory card 74 is subjected to photoelectric conversion by a photosensing circuit 76. The waveform of the converted signal is shaped by a buffer 77, and the shaped signal is input to a key contact circuit 78. The key contact circuit 78 converts the signal for a dial number from the telephone directory card 74 into a corresponding key-depressing signal. A dialer IC 79 transmits pulses or DTMF dial signal corresponding to the key-depressing signal to the telephone circuit. A pulse generation unit 80 generates pulses in the case of a pulse signal, or a DTMF signal is transmitted by a speech network 81 in the case of a DTMF signal.

The handset 71 is connected to the speech network 81, and a key-depressing signal from a keyboard provided in the handset is also input to the dialer IC 81 as well as the key-depressing signal from the key contact circuit 78. When the DTMF signal is used for calling, the DTMS signal generated in the speech network 81 is output to the telephone circuit via the pulse generation unit 80.

Accordingly, it is possible to perform the calling of a station to communicate in accordance with a command from the handset 71 or the telephone directory card 74.

The dial signal is transmitted to the telephone circuit via a hook switch 82 and a bridge diode 83. The hook switch 82 is opened or closed in accordance with the on/off-hook state of the handset 71. When the handset 71 is in an on-hook state, the hook switch 82 is opened, and when the hand-set 71 is in an off-hook state, the hook switch 82 is closed.

As shown in FIG. 9, the optical interface circuit 75 comprises the key contact circuit 78, the buffer 77 and the photosensing circuit 76. A power-supply voltage Vsup is used in common in the optical interface circuit 75.

Next, an explanation will be provided of the supply of the power-supply voltage $V_{sup}$ in the optical interface circuit 75.

In the present embodiment, the power-supply voltage $V_{sup}$ is supplied to the units in the optical interface circuit 75 from either one of the telephone circuit and a battery 84. The battery 84 is used as a power supply for the optical interface circuit 75 and the dialer IC 74 when the telephone circuit voltage is low. The switching between the above-described power supplies is performed by a power supply switching unit 85, which comprises an analog switch, a relay or the like, in accordance with the communication state or, in more detail, the operation state of the hook switch 82.

A voltage detection unit 86 for detecting the circuit voltage as well as the above-described pulse generation unit 80 are connected to the hook switch 82. The circuit-side line of the hook switch 82 is connected to the power supply switching unit 85 via a resistor 87. The resistor 87 has a large value which is determined in order to satisfy a standard when the circuit voltage is utilized, and supplies the power supply switching unit 85 with the circuit voltage.

The power supply switching unit 85 selects the supply source of the power-supply voltage $V_{sup}$ for the optical interface circuit 75 and the dialer IC 79 in accordance with the output from the voltage detection unit 86. The voltage detection unit 86 merely determines the existence of the voltage input, and is configured by transistors, relays and the like.

When the hook switch 82 is closed, and the circuit voltage is detected by the voltage detection unit 86, the power supply switching unit 85 supplies the optical interface circuit 75 and the dialer IC 79 with the power-supply voltage $V_{sup}$ from the battery 84. When the hook switch 82 has been opened (an on-hook state), the power-supply voltage $V_{sup}$ is supplied from the circuit. According to the above-described configuration, when the telephone circuit is not closed, that is, in an on-hook state, the voltage detection unit 86 cannot detect the voltage. Hence, the power supply switching unit 85 switches so as to supply to the optical interface circuit power from the circuit via the resistor 87. The dialer IC can thereby back up built-in memories, such as a redial memory and the like.

When the telephone circuit is closed, that is, when the operator performs an off-hook operation of the handset 71 for facsimile communication or voice communication, the hook switch 82 is short-circuited. The voltage detection unit 86 detects the voltage, operates the power supply switching unit 85, and switches the power supply for the optical interface circuit 75 and the dialer IC 79 from the circuit to the battery 84. Accordingly, the optical interface circuit 75 can perform a stable operation by the constant-voltage power supply from the battery 84. Thus, according to the present embodiment, an optical interfacing operation between the telephone directory card 74 and the main body can be securely performed particularly during a communication period requiring the prevention of misoperation.

In the above-described configuration, the power supply for the optical interface circuit 75 in the main body is supplied from the battery in an off-hook state, and from the telephone circuit in an on-hook state. In general, an optical interfacing operation between the telephone directory card 74 and the main body for a calling operation is performed in an off-hook state. In this case, the optical interfacing operation can be securely performed by a constant voltage output from the battery 84. Furthermore, in the present embodiment, the retention of the memory in the dialer IC 79 is performed by the circuit voltage in an on-hook state. In a usual facsimile, the period during off-hook states is estimated to be about 1/10 of the period during on-hook states in usual conditions of use. Hence, it becomes possible to reduce the capacity of the battery 84.

Although, in the above-described embodiment, an explanation has been provided illustrating a facsimile, the same configuration may also be used for a telephone set or the like. Furthermore, the same configuration may be used even when a configuration other than an optical interface circuit is used for communication between the telephone directory card and the main body. In addition, the communication state may be identified by mechanically detecting the on/off state of the hook switch without using the voltage detection unit 86.

In the present embodiment, a communication apparatus for calling a station to communicate performs data input and output between a telephone directory card, configured so as to be detachable relative to the main body of the apparatus, via a predetermined communication interface. The communication apparatus controls a switch so as to supply the power for the communication interface provided in the main body of the apparatus from the circuit during a non-communication period, and from the power-supply device incorporated in the main body of the apparatus during a communication period. Accordingly, in a communication state, it is possible to perform communication with the telephone directory card by the built-in power supply without using the unstable circuit voltage. To the contrary, in a non-communication state, the circuit voltage is used. Thus, unnecessary power consumption of the built-in power supply can be prevented. Hence, the present embodiment has the excellent effect that it is possible to control an calling operation according to stable data communication with the telephone directory card.

Sixth Embodiment

Figure 10:
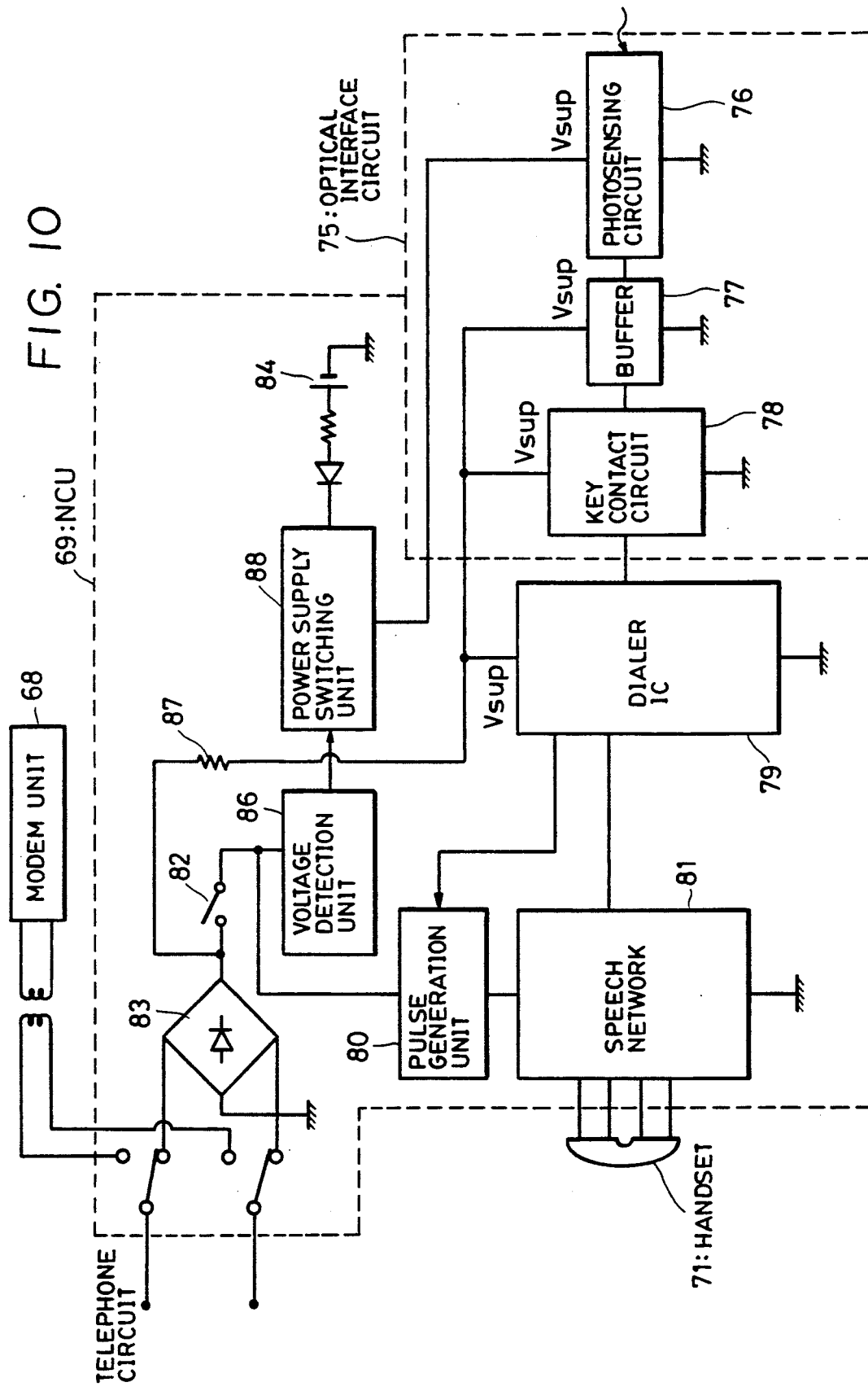
FIG. 10 is a block diagram of a sixth embodiment.

FIG. 10 shows a modified example of the fifth embodiment. The same components as in the fifth embodiment are indicated by the same numerals. In the sixth embodiment, when the voltage detection unit 86 has detected the voltage, a power supply switching unit 88 connects the battery 84 to the photosensing circuit 76. If the voltage detection unit 86 does not detect the voltage, the power supply switching unit 88 does not supply the photosensing circuit 76 with power. Accordingly, it is possible to prevent the entry of unnecessary signals in the dialer IC 79 in an on-hook state. The circuit always supplies the dialer IC 79, the key contact circuit 78, and the buffer 77 with electric power so as to prevent the battery 84 from consuming extra electric power.

Although the present invention has been explained according the preferred embodiments, the present invention is not limited to the configuration of the above-described embodiments, but various changes and modifications may be made within the scope of the appended claims.

What is claimed is:

1. A communication system comprising a card-like device and a data receiving apparatus for receiving data from said card-like device,
said data receiving apparatus comprising:
communication means for communicating via a line on the basis of data received from said card-like device;
obtaining means for obtaining electric power from the line;
a first internal power supply for generating electric power independently of the electric power from the line; and
first supply means for supplying said card-like device with electric power from a selected one of said obtaining means and said first internal power supply, and
said card-like device comprising:
transmission means for transmitting data to said data receiving apparatus without using a conductor;
a second internal power supply for generating electric power independently of the electric power from said first supply means; and
second supply means for supplying said transmission means with electric power from a selected one of said first supply means and said second internal power supply.

2. A communication system according to claim 1, wherein said obtaining means includes light emitting means for emitting light in response to a current from the line, and conversion means for converting the light emitted from said light emitting means photoelectrically.

3. A communication system according to claim 1, wherein said second supply means supplies said transmission means with electric power from said second internal power supply in a state in which electric power is not supplied from said first supply means.

4. A communication system according to claim 3, wherein said card-like device includes storage means for storing data, which holds the data using electric power from said second internal power supply.

5. A communication system according to claim 4, wherein said card-like device includes a keyboard for registering the data in said storage means.

6. A communication system according to claim 1, wherein said transmission means transmits the data by light.

7. A communication system according to claim 1, wherein said transmission means transmits the data by audio signal.

8. A communication system according to claim 1, wherein said data receiving apparatus includes calling means for calling in accordance with the received data, and wherein said transmission means transmits a number to call.

9. A communication system according to claim 1, wherein said first supply means supplies said card-like device with electric power from said first supply means when electric power is supplied from said first internal power supply, and from the closed line when electric power is not supplied from said first internal power supply.

10. A communication system according to claim 1, wherein said second supply means supplies said card-like device with electric power from said first supply means when electric power is supplied from said first supply means, and from the closed line when electric power is not supplied from said first supply means.

11. A communication system according to claim 1, wherein said first supply means supplies said card-like device with electric power from said first supply means when electric power is supplied from said first internal power supply, and from the closed line when electric power is not supplied from said first internal power supply.

12. A communication system according to claim 1, wherein said second supply means supplies said card-like device with electric power from said first supply means, and from the closed line when electric power is not supplied from said first supply means.

13. A communication system comprising a card-like device for transmitting a dial number and a communication apparatus for calling in accordance with the dial number transmitted from said card-like device,
said communication apparatus comprising:
sending means for sending a dialing signal to a line in accordance with the dial number transmitted from said card-like device;
obtaining means for obtaining electric power from the line;
a first internal power supply for generating electric power independently of the electric power from the line; and
first supply means for supplying said card-like device with electric power from a selected one of said obtaining means and said first internal power supply, and
said card-like device comprising:
transmission means for transmitting the dial number without using a conductor;
a second internal power supply for generating electric power independently of the electric power from said first supply means; and
second supply means for supplying said transmission means with electric power from a selected one of said first supply means and said second internal power supply.

14. A communication system according to claim 13, wherein said communication apparatus performs communication via a line.

15. A communication system according to claim 14, wherein said supply means supplies an electric power from a power supply in said communication apparatus or from the line.

16. A communication system according to claim 13, wherein said obtaining means includes light emitting means for emitting light in response to a current from the line, and conversion means for converting the light emitted from said light emitting means photoelectrically.

17. A communication system according to claim 13, wherein said second supply means supplies said transmission means with electric power from said second internal power supply in a state in which electric power is not supplied from said first supply means.

18. A communication system according to claim 17, wherein said card-like device includes storage means for storing dial numbers, and holds the dial numbers using electric power from said second internal power supply.

19. A communication system according to claim 13, wherein said transmission means transmits the dial number by light.

20. A communication system according to claim 13, wherein said transmission means transmits the dial number by audio signal.

21. A communication system according to claim 13, wherein said first supply means supplies said card-like device with electric power from said first supply means when electric power is supplied from said first internal power supply, and from the closed line when electric power is not supplied from said first internal power supply.

22. A communication system according to claim 13, said first supply means further including selecting means for selecting one of said obtaining means and said first internal power supply in accordance with whether the line is closed.

23. A communication apparatus comprising:
communication means for performing communication via a line;
photosensing means; and
supply means for supplying said photosensing means with electric power from said line;
wherein said communication means performs communication in accordance with a photosensed output from said photosensing means.

24. A communication apparatus according to claim 23, further including power supply means, and wherein said supply means supplies said photosensing means with electric power from a selected one of said power supply means and the line.

25. A communication apparatus according to claim 24, wherein said power supply means comprises a battery.

26. A communication apparatus according to claim 24, wherein said power supply means generates electric power independently of the electric power from the line.

27. A communication apparatus according to claim 24, wherein said supply means supplies said reception means with electric power from the line when the line is open, and from said power supply means when the line is closed.

28. A communication apparatus according to claim 24, wherein said first supply means supplies said card-like device with electric power from said first supply means when electric power is supplied from said first internal power supply, and from the closed line when electric power is not supplied from said first internal power supply.

29. A communication apparatus according to claim 23, wherein said communication means transmits data received by said photosensing means.

30. A communication apparatus according to claim 23, said supply means further supplies said communication means with electric power from said line.

31. A communication apparatus comprising:
reception means for receiving data photoelectrically;
communication means for performing communication via a line, said communication means performing communication in accordance with the data received by said reception means;
power supply means; and
supply means for supplying said reception means with electric power from a selected one of said power supply means and the line.

32. A communication apparatus according to claim 31, wherein said supply means includes obtaining means for obtaining electric power from the line.

33. A communication apparatus according to claim 31, wherein said power supply means generates electric power independently of the electric power from the line.

34. A communication apparatus according to claim 31, wherein said supply means supplies said reception means with electric power from the line when the line is open, and from said power supply means when the line is closed.

35. A communication apparatus according to claim 31, said supply means further including selecting means for selecting one of said power supply means and the line in accordance with whether the line is closed.

36. A communication apparatus according to claim 31, said supply means further supplies said communication means with electric power from the selected one of said power supply means and the line.

* * * * *